Patented July 9, 1946

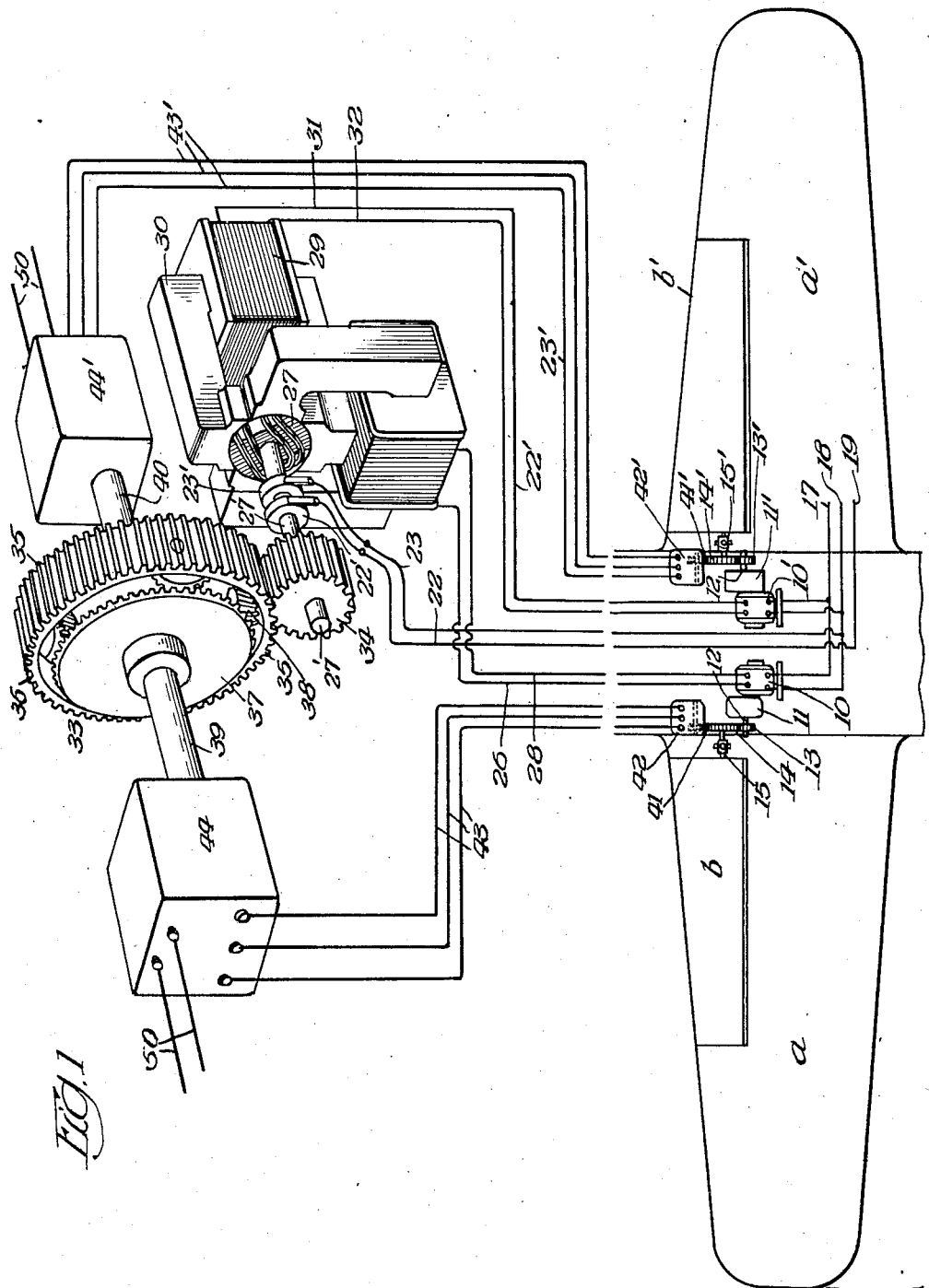

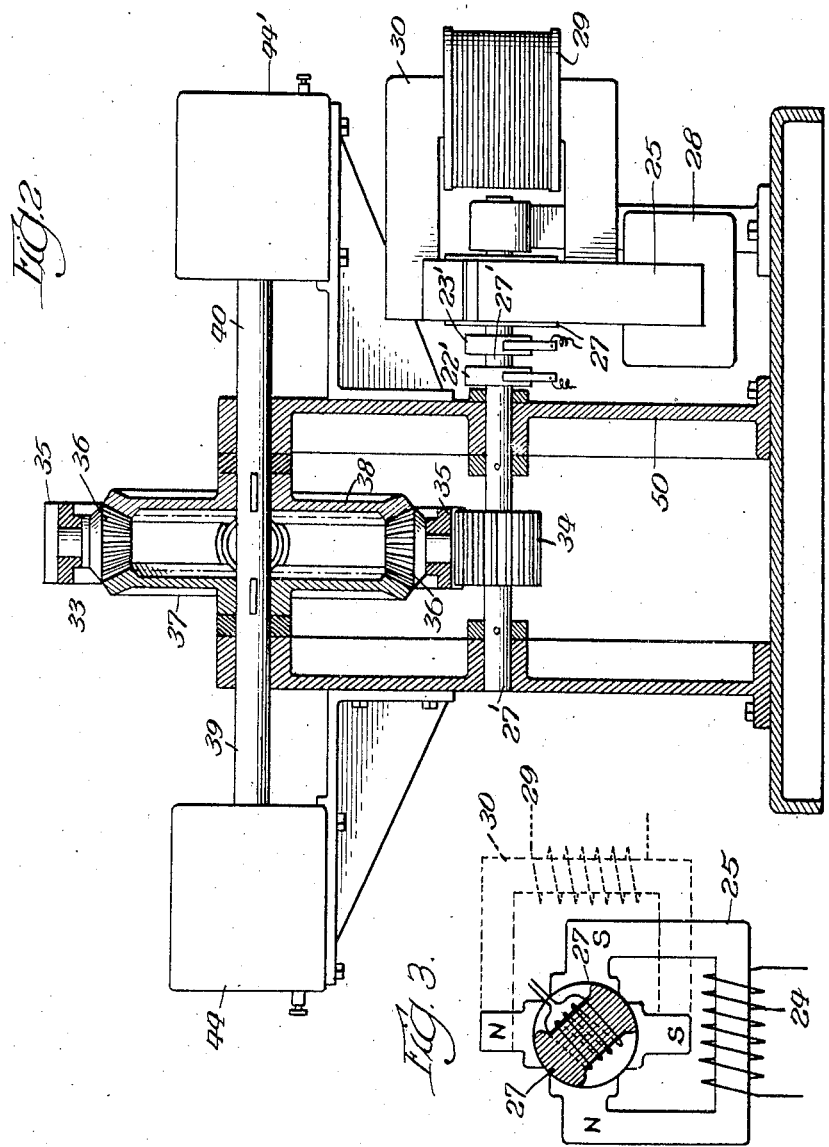

2,403,577

UNITED STATES PATENT OFFICE 2,403,577

ELECTROMECHANICAL SYNCHRONIZING MECHANISM

Charles J. Breitwieser, San Diego, Calif., assignor to Consolidated Vultee Aircraft Corporation, San Diego, Calif., a corporation of Delaware Application November 23, 1944, Serial No. 564,839

9 Claims. (Cl. 172—293)

1

This invention relates to means for synchronizing the movements of mechanisms independently operated and located remote from one another.

The invention, as described herein, is directed particularly to the control of the movements of the wing flaps of airplanes to effect an equalization of the displacement thereof.

The application of the invention to the control of the wing flaps is by way of example only; it is understood that the invention is adapted to control the movements of independently-operated mechanisms generally.

During the extension or retraction of flaps on opposite sides or wings of an airplane for landings and takeoffs it is essential that equal displacement of such flaps be held within close limits to prevent dangerous rolling movement of the airplane. These landings and take-offs usually occur at low altitudes where recovery from such rolling movement is most difficult or impossible and therefore equal displacements on opposite sides of the airplane is of importance in operation. The larger types of airplanes require power-operated shifting mechanism and a pair of electric motors for separately shifting the flaps are used because space and weight limitations render a positive mechanical couple between the flaps undesirable. In practice it has been found that the relative loads imposed upon the motors for shifting the flaps vary as the result of interference by ice or dirt or by the jamming of a flap or the shifting mechanisms so that the desired equal displacement of the flaps by the motors will then not be attained.

One object of the invention is to provide apparatus which includes plural phase electric motors for shifting the flaps at the opposite sides of the airplane, respectively, and automatic phase changing means for the motors for relatively varying the torque produced by the motors and synchronizing the movement of the flaps on opposite sides or wings of the airplane when the flaps or their shifting mechanism unequally load the motors.

Another object of the invention is to provide apparatus of this type which includes an automatically controlled phase changer for the electric motors for synchronizing or equalizing the movements of the flaps on opposite sides of the airplane.

Another object of the invention is to provide improved flap-shifting mechanism operable by separate electric motors which includes means for synchronizing the movements of the flaps

2 which is simple in construction and efficient and reliable in operation.

Other objects of the invention will appear from the detailed description.

The invention consists in the several novel features hereinafter set forth and more particularly defined by claims at the conclusion hereof.

In the drawings:

Fig. 1 is a diagrammatic view illustrating an airplane equipped with flaps, motors and the reduction gearing for shifting the flaps, respectively, and including a perspective view of the automatic synchronizing mechanism.

Fig. 2 is a view, partly in section and partly in elevation of the phase changer and the differential couple for controlling the phase changer.

Fig. 3 is a diagrammatic view of the armature and the fields and coils of the phase changer illustrating the armature in its normal position when the motors are equally loaded.

The invention is exemplified in an airplane which comprises a right side wing $a$ and a left side wing $a'$. Wing $a$ is equipped with a flap $b$ which is usually pivotally or otherwise supported adjacent the trailing edge of said wing, for movement from a neutral position to an extended or depressed position, as well understood in the art. The wing $a'$ is similarly equipped with a flap $b'$. These flaps, during landing or take-off, are shifted to extend rearwardly and downwardly for increasing drag or lift, and for stabilized operation should be positioned at the same angle of incidence.

Separate electric motors 10, 10' are provided for operating the flaps $b$, $b'$, each motor operating the mechanism for shifting one of the flaps. These motors are of the plural-phase type, for example 120 volts per phase and 400 cycles per phase, with one phase which may be termed phase "A" being supplied directly from the supply line to the motor, and the other termed phase "B" being supplied to the motors through a phase changing transformer for effecting synchronized operation of the flaps when the motors are equally loaded by the flaps. Phase "A" current is supplied to each of the motors by line conductors 17 and 18.

Electric motor 10 is connected to shift the flap $b$ by any suitable mechanism, for example a reduction gear 11, the input of which is connected to the motor, a gear 13 on the output shaft 12 of the reduction gear 11 meshing with gear 14 on a shaft 15 which is pivotally supported to swing the flap $b$ relatively to the wing $a$ from its neutral position to varying depressed positions or angles, as well understood in the art.

Electric motor 10' is connected to shift the flap b' by similar mechanism, which includes a reduction gear 11', the input of which is connected to motor 10', a gear 13' on the output shaft 12' of the reduction gear 11' and a gear 14', meshing with gear 13' and fixed to a shaft 15' which pivotally supports the flap b' to swing relatively to the wing a', from its neutral position to varying depressed positions or angles.

In practice, it frequently occurs that the flaps or their operating mechanism are retarded or obstructed by ice, dirt or from other causes, which impose unequal loads on the electric motors 10, 10' which normally produce equal torque. This results in the operation of one of the motors at a differential speed relatively to the other motor and corresponding differential displacement of the flaps or stoppage of one of the flaps. This differential displacement of the flaps may cause rolling of the airplane during landings or take-offs. In some instances one flap or its shifting mechanism may become jammed to such an extent that it will not be displaced by its operating motor.

A phase changer, generally designated 20, is provided for selectively controlling the supply of phase "B" current to the motors 10 and 10', and for relatively varying the voltage and/or phase supplied to, and the torque produced by, said motors. This phase changer is automatically controlled by the relative displacing movements of the flaps b and b' through a differential gear couple which is electrically controlled by the movement of the flaps, respectively. Phase "B" current is supplied to the winding of the rotatable armature 21 of changer 20 via conductors 22 and 23 which are connected respectively to line conductors 19 and 18. Conductors 22 and 23 are connected to the winding around armature 27 by brush and ring contactors 22' and 23' on the shaft 27' of said armature to permit rotation of the armature 27. The phase changer comprises a coil 24 which is wound around a field 25, and connected by conductors 26 and 28 to supply phase "B" current to the electric motor 10. The phase changer comprises a second coil 29 which is wound on a field 30 and connected, by conductors 31 and 32, to supply phase "B" current to the electric motor 10'. Each of the fields 25 and 30 comprises a pair of diametrically opposite arcuate terminals adjacent the periphery of armature 27. The pole faces of field 25 are disposed at right angles to the pole faces of field 30. The armature 27 is normally positioned, as illustrated in Fig. 1, to deliver current of equal voltage and phase to both of the fields 25 and 30 and to supply phase "B" current of equal voltage to, and produce equal torque in, the motors 10 and 10', for their synchronous operation when under equal loads.

Armature 27 of the phase changer 20 is rotatable for changing phase "B" current to motors 10 and 10' and its rotative movements in either direction are controlled by the differential gear couple which is generaly designated 33 and is responsive to relative movements of the flaps b and b'. This couple comprises a gear 34 fixed to the shaft 27' of armature 27; a gear ring 35 which carries studs for a set of four planetary bevel pinions 36; and gears 37 and 38 which mesh with opposite sides of the planetary pinions; a shaft 39 fixed to and for rotating gear 37; and a separate coaxial shaft 40 fixed to gear 38. Rotation of either of the gears 37, 38 relatively to each other will, through planetary pinions 36, rotate the gear ring 35 which will rotate the gear 34 and the armature 27 directionally and proportionately to the relative rotation of shafts 39 and 40. The apparatus for rotating shaft 39 correspondingly to the movements of the right flap b comprises a gear 41 which meshes with gear 14 on the shaft 15 of flap b for driving an electrical "Selsyn" transmitter 42 which is connected by three conductors 43 to a "Selsyn" receiver 44 which is connected and adapted to rotate shaft 39 and gear 37. Similarly, the shaft 40 is operated responsively to the movements of the flap b' by gear 41' which meshes with gear 14' on the shaft 15' of the flap b', a "Selsyn" transmitter 42', three conductors 43' and a "Selsyn" receiver 44'. Each of the Selsyn receivers 44 and 44' is connected by a pair of conductors 50 to a single phase alternating current power source, as well understood in the art.

The motors 10, 10' are of the reversible type and their operation for shifting the flaps may be controlled by suitable switch mechanism for extending and retracting the flaps, as well understood in the art. The several parts of the phase changer and differential couple are mounted in a suitable frame 50.

In operation, when the flaps b, b' are in their retracted or raised position, the armature 27 of the phase changer 20 will be in its normal position, as illustrated in Fig. 1. When the flaps are to be extended or lowered and the flaps b and b' impose equal loads upon the motors 10, 10', respectively, the differential couple 33 will remain inactive, the armature 27 of the phase changer will remain in its normal position, and phase "A" current of the same voltage from line conductors 17 and 18 will be supplied to both motors, and phase "B" current of equal voltage and phase will be supplied via the winding of the armature 27, which is connected to conductors 18, 23, fields 25, 30, and coils 18 and 29 to both motors. The motors will then supply equal torque for shifting the flaps b, b', respectively, and the latter will move at equal speed. If and when the loads imposed on one of the motors 10, 10' by the flaps should be relatively increased from any cause, the increased load will tend to reduce the speed of or retard the motor for shifting it, and the differential loads imposed on the motors tend to cause the operation of the flaps at differential speeds. The motor with the increased load and the flap shifted thereby will tend to lag behind the other motor and the flap operated thereby. The differentially moving flaps, through the gear connections with the flaps, will cause the actuation of the "Selsyn" transmitters and the "Selsyn" receivers to produce relatively opposite rotation of the shaft 39, 40 proportionately to the unequal loads, so that the gear 37, 38 will be rotated relatively to each other and operate the planetary gears 36 to rotate gear ring 35, gear 34, and the armature 27 of the phase changer. The armature will be rotated in the direction which will increase the phase "B" voltage to the field and coil of the phase changer which are connected to the lagging motor and simultaneously proportionately reduce the phase "B" voltage supplied to the other motor through the other field and coil of the phase changer.

The increase of phase "B" voltage and/or phase angle to the lagging motor and the decrease of voltage and/or phase angle of the same phase to the other motor will cause the motors to produce additional torque for operating the lagging flap and decreased torque to the other motor so as to compensate for the varying loads and operate the flaps at substantially the same speed until the flaps are equally extended or lowered. This differential supply of voltage and phase to the motors will continue so long as the differential loads upon the motors continue and until the differential couple 33 and armature 27 have been shifted to their normal position by the equalized movement of the flaps. The rotation of the armature 27 may continue through 360°. For example, assuming the load of flap b on motor 10 has been increased so that it is greater than the load on the motor 10', and motor 10, as a result, lags or operates at a lower speed than the motor 10', the "Selsyn" transmitters 42, 42', which are responsive to flap b, b', respectively, will actuate receivers 44, 44' to produce relative opposite rotation of gears 37, 39 which, through planetary gears 36, will rotate ring 35 and gear 34 and armature 27, proportionately to the increased load in that direction which will cause said armature to increase the voltage and phase angle of phase "B" current through coil 24 to the motor 10 and increase its torque and speed. Simultaneously, armature 27 will reduce the phase "B" voltage and phase angle supplied to motor 10' through field 30 and coil 29 which will proportionately reduce the torque and speed of motor 10' through field 30 and coil 29 and the movement of the flap b'. Proportionately to the overload on the motor 10, the armature 27 will be successively rotated: to supply the maximum phase "B" voltage via coil 24 to motor 10 and substantially no current of the same phase to the motor 10, during rotation of the armature 45° from its normal position; to displace the phase "B" voltage from coil 24, and motor 10 with voltage of reversed polarity to the coil 29 and motor 10' during the succeeding 90° rotation of the armature 27 in the same direction; to displace the phase "B" voltage of reversed polarity from coil 29 to the coil 24 and motor 10 upon an additional 90° rotation of the armature 27; upon an additional 45° rotation of the armature 27 to supply equal voltage to coils 24 and 29.

In like manner, if the motor 10' is overloaded, the differential couple 33 will operate armature 27 of the phase changer 20 to increase phase "B" voltage and phase angle from coil 29 for an increase of torque in said motor and simultaneously decrease the phase "B" voltage and phase angle from coil 24 to motor 10 to compensate for such variation in the loads and to successively displace the voltage and reverse its polarity in the coils 29 and 24 in the manner last described.

If one of the flaps should become jammed, the differential couple will operate the phase-shifter until a complete reversal of the phase "B" voltage to the free motor occurs and this will cause the free flap to hunt about the position of the jammed flap, so that the free flap will move only a very limited degree relatively to the jammed flap on the opposite side of the airplane.

The invention exemplifies simple, efficient and automatic means for controlling electric motors for shifting flaps to compensate for conditions which cause the flaps to impose unequal loads on the motors and to equalize and synchronize the displacement of the flaps at the opposite sides of the airplane.

The apparatus described provides for substantially complete and uniform synchronization of the movements of the flaps during their entire movement in both directions; unbalanced loading on the flaps is automatically compensated for; the compensating force is constantly increased proportionately to relieve displacement of the flaps; there will be no substantial overtravel if the flaps become jammed; the apparatus is light in weight and compact; and no adjustments are necessary after installation.

While the apparatus is herein shown and described as applied to use in equalizing the movement of the wing flaps of aircraft, it is to be understood that such apparatus may also be employed for synchronizing the movement of correlated movable elements or mechanisms of various machines.

Furthermore, the invention is not to be understood as restricted to the details set forth, since these may be modified within the scope of the appended claims without departing from the spirit and scope of the invention.

Having thus described the invention, what I claim as new and desire to secure by Letters Patent is:

1. Apparatus for operating a pair of correlated movable members, comprising: a pair of plural phase electric motors, means for shifting one of the members from one of the motors and the other members from the other motor, and means, responsive to relative variations in the operating loads in shifting both members, for producing relative variation in the torque of the motors and compensating for said variations in the loads to substantially equalize the displacement of the members.

2. Apparatus for operating a pair of correlated members, comprising: a pair of plural phase electric motors, means for shifting one of the members from one of the motors and the other member from the other motor, and means, responsive to relative variations in the operating loads in shifting the members, for producing relative variation in the torque of the motors and synchronizing the movement of the members under said variations in the loads.

3. Apparatus for operating a pair of correlated movable members, comprising: a pair of plural phase electric motors, means for shifting one of the members from one of the motors and the other member from the other motor, and means, responsive to relative variations in the operating loads in shifting the members, for controlling the relative supply of one phase to said motors for producing relative variation in the torque of the motors and compensating for said variations in the loads to substantially equalize the displacement of the members.

4. Apparatus for operating a pair of correlated movable members comprising: a pair of plural phase electric motors, means for shifting one of the members from one of the motors and the other member from the other motor, a phase changer for relatively varying the phase and voltage of the current to said motors, and means responsive to relative variations in the operating loads in shifting the members, for actuating the phase changer to produce relative variation in the torque and speed of the motors and compensating for said variations in the loads to substantially equalize the displacement of the members.

5. Apparatus for operating a pair of correlated movable members, comprising: a pair of plural phase electric motors, means for shifting one of the members from one of the motors and the other member from the other motor, a phase changer for relatively varying the voltage phase of the current to said motors, and means responsive to relative variations in the operating loads in shifting the members and including a differential couple, for actuating the phase changer to produce relative variations in the torque of the motors and compensate for said variations in the loads to substantially equalize the displacement of the members.

6. Apparatus for operating a pair of correlated movable members, comprising: a pair of plural phase electric motors, means for shifting one of the members from one of the motors and the other member from the other motor, a phase changer for relatively varying the phase, voltage and polarity of the current to said motors, and means responsive to relative variations in the operating loads in shifting the members, for actuating the phase changer to control the relative supply and polarity of one phase to said motors, and producing relative variation in the torque and speed of the motors and compensating for said variation in the loads to substantially equalize the displacement of the members.

7. Apparatus for operating a pair of correlated movable members, comprising: a pair of plural phase electric motors, means for shifting one of the members from one of the motors and the other member from the other motor, a phase changer for relatively varying the phase, voltage and polarity of the current to said motors, and a differential couple controlled by relative movements of the members, responsive to relative variations in the operating loads in shifting the members, for actuating the phase changer to produce relative variation in the torque, speed and direction of rotation of the motors and compensating for said variation in the loads to substantially equalize the displacement of the members.

8. Apparatus for operating a pair of flaps on opposite sides of an airplane, comprising: a pair of plural phase electric motors, means for shifting one of the flaps from one of the motors and the other flap from the other motor, and means, responsive to relative variations in the operating loads in shifting the flaps, for producing relative variation in the torque of the motors and compensating for said variations in the loads to substantially equalize the displacement of the flaps.

9. Apparatus for operating a pair of flaps on opposite sides of an airplane, comprising: a pair of plural phase electric motors, means for shifting one of the flaps from one of the motors and the other flap from the other motor, a phase changer for relatively varying the phase, voltage and polarity of the current to said motors, and means responsive to relative variations in the operating loads in shifting the flaps, for actuating the phase changer to control the relative supply and polarity of one phase to said motors, and producing relative variation in the torque and speed of the motors to compensate for said variation in the loads and substantially equalize the displacement of the flaps, said phase shifter operating, when one flap becomes jammed, to shift the phase of the motor, which operates the freely movable flap, through 360° whereby to effect alternate reversals of this motor to maintain the freely movable flap in substantially the same plane as the jammed flap.

C. J. BREITWIESER.